(12) United States Patent
Inoue et al.

(10) Patent No.: US 11,370,030 B2
(45) Date of Patent: Jun. 28, 2022

(54) MANUFACTURING METHOD FOR THREE-DIMENSIONAL MOLDED OBJECT, LAMINATION MOLDING APPARATUS, AND THREE-DIMENSIONAL MOLDED OBJECT

(71) Applicant: SODICK CO., LTD., Kanagawa (JP)

(72) Inventors: Satoru Inoue, Kanagawa (JP); Soichiro Tanaka, Kanagawa (JP); Shinya Moriyama, Kanagawa (JP)

(73) Assignee: SODICK CO., LTD., Kanagawa (JP)

( * ) Notice: Subject to any disclaimer, the term of this patent is extended or adjusted under 35 U.S.C. 154(b) by 109 days.

(21) Appl. No.: 16/835,325

(22) Filed: Mar. 31, 2020

(65) Prior Publication Data
US 2020/0316687 A1 Oct. 8, 2020

(30) Foreign Application Priority Data
Apr. 5, 2019 (JP) ............... JP2019-072673

(51) Int. Cl.
*B22F 10/20* (2021.01)
*B33Y 10/00* (2015.01)
(Continued)

(52) U.S. Cl.
CPC .............. *B22F 10/20* (2021.01); *B22F 10/30* (2021.01); *B33Y 10/00* (2014.12); *B33Y 30/00* (2014.12); *B33Y 50/02* (2014.12); *B33Y 80/00* (2014.12)

(58) Field of Classification Search
CPC .......... B22F 10/20; B22F 10/30; B33Y 10/00; B33Y 30/00; B33Y 50/02; B33Y 80/00
See application file for complete search history.

(56) References Cited

U.S. PATENT DOCUMENTS 8,999,222 B2  4/2015 Abe et al.
2015/0360421 A1* 12/2015 Burhop .............. G05B 19/4097
700/98
(Continued)

FOREIGN PATENT DOCUMENTS

CN  105073308  11/2015
CN  105522149   4/2016
(Continued)

OTHER PUBLICATIONS

"Office Action of Taiwan Counterpart Application", dated Jan. 7, 2021, with English translation thereof, p. 1-p. 12.
(Continued)

*Primary Examiner* — Yung-Sheng M Tsui
(74) *Attorney, Agent, or Firm* — JCIPRNET

(57) ABSTRACT

A lamination molding apparatus of the present disclosure includes: a recoater head that forms a material powder layer by uniformly spreading metal material powder on a modeling table at a predetermined height; a laser light irradiation device that irradiates the material powder layer with laser light, and heats and melts the material powder to form a sintered layer; and a control device that forms a sintered body, which is an three-dimensional molded object, by repeatedly driving and controlling the recoater head and the laser light irradiation device; the control device reads sintered body data, that is configured by the shape of a base part in which at least a plurality of support members with constricted central portion are arranged continuously and the shape of a main body part which is a final molded product, and drives and controls the laser light irradiation device and the recoater head to form the sintered body.

3 Claims, 17 Drawing Sheets

(51) Int. Cl.
  *B33Y 30/00*    (2015.01)
  *B33Y 50/02*    (2015.01)
  *B33Y 80/00*    (2015.01)
  *B22F 10/30*    (2021.01)

(56)         References Cited

U.S. PATENT DOCUMENTS

2016/0009039 A1    1/2016  Blanchet
2016/0107233 A1    4/2016  Kobayashi et al.
2016/0370791 A1*  12/2016  Revanur ............ G05B 19/4099
2017/0066198 A1*   3/2017  Ur ........................ B29C 64/112
2018/0147779 A1    5/2018  Yamada et al.
2019/0030825 A1*   1/2019  Morishita .............. B33Y 10/00

FOREIGN PATENT DOCUMENTS

CN       207028211       2/2018
JP       H0985837        3/1997
JP       5653657         1/2015
JP       2017128770      7/2017
JP       6349561         7/2018
WO       2017163405      9/2017

OTHER PUBLICATIONS

"Office Action of Japan Counterpart Application", dated Jan. 27, 2020, with English translation thereof, p. 1-p. 8.

* cited by examiner

MANUFACTURING METHOD FOR THREE-DIMENSIONAL MOLDED OBJECT, LAMINATION MOLDING APPARATUS, AND THREE-DIMENSIONAL MOLDED OBJECT

CROSS-REFERENCE TO RELATED APPLICATION

This application claims the priority benefit of Japan patent application serial no. 2019-072673, filed on Apr. 5, 2019. The entirety of the above-mentioned patent application is hereby incorporated by reference herein and made a part of this specification.

BACKGROUND

Technical Field

The present disclosure relates to a manufacturing method and an lamination molding apparatus with which a desired three-dimensional molded object is obtained, by repeating an operation for spreading metal material powder on a modeling table to form a material powder layer and an operation for irradiating a predetermined irradiation region of the material powder layer with laser light or electron beam to form a sintered layer, and laminating the sintered layers to form a sintered body having a desired three-dimensional shape. Particularly, the present disclosure relates to a manufacturing method for three-dimensional molded object that reduces a warpage (sleigh) generated in the three-dimensional molded object, a lamination molding apparatus, and a three-dimensional molded object in which the warpage is reduced.

Related Art

U.S. Pat. No. 8,999,222 discloses a manufacturing method for three-dimensional molded object in which a recoating step for forming a material powder layer and a sintering step for forming a sintered layer are alternately repeated. Specifically, the recoating step uniformly spreads metal material powder on a modeling table at a predetermined height to form a material powder layer. The sintering step irradiates a predetermined irradiation region of the material powder layer with laser light or electron beam, heats and melts the material powder and then cools and solidifies the material powder, and thereby sinters the material powder layer in a predetermined irradiation region to form a sintered layer. The three-dimensional molded object is a three-dimensional shaped sintered body formed by laminating sintered layers on a modeling table. Furthermore, the manufacturing method for three-dimensional molded object described above also discloses that a cutting step for cutting the outer periphery of the sintered body every time when a plurality of sintered layers are laminated is added as necessary.

Generally, a base plate is detachably mounted on the modeling table. The sintered layers are laminated on the base plate. The base plate protects the modeling table and facilitates the fixation of the sintered layers. The sintered body after the lamination molding is fixed to the base plate. The three-dimensional molded object is removed from the modeling table together with the base plate, and is cut from the base plate using a wire electric discharge machine or the like. The three-dimensional molded object is subjected to finishing using a cutting machine, a wire electric discharge machine, or the like in secondary processing. The three-dimensional molded object before the secondary processing includes an allowance that is removed when the finishing is performed to obtain the product size and the product shape in the secondary processing.

The manufacturing method for three-dimensional molded object disclosed in Japanese Patent Laid-Open No. 09-085837 discloses that, when a modeled object having a desired three-dimensional shape is formed by sequential lamination, a support unit of a part requiring support among the three-dimensional molded object is also formed by sequential lamination.

The three-dimensional molded object fixed to the base plate is restrained by the base plate. The three-dimensional molded object separated from the base plate may be warped due to the release of internal residual stress. For example, the warpage makes a central part, of a surface opposite to the side fixed to the base plate in the three-dimensional molded object, concave.

The sintered layer shrinks when the material powder being heated and melted is cooled and solidified to form the sintered layer. Because one side is fixed to the base plate or the sintered body, the sintered layer about to shrink is tensioned to the base plate or the sintered body. Tension stress that resists a force for tensioning the sintered layer remains in the sintered layer. The tension stress is accumulated as the residual stress inside the sintered body every time the sintered layer is formed.

The warpage reduces the dimensional precision and shape precision of the three-dimensional molded object before the secondary processing is performed. It is necessary to further increase the allowance for performing the secondary processing on the three-dimensional molded object in which the warpage is generated. Regarding the three-dimensional molded object having a large allowance, the modeling time is increased by lamination molding of the increased allowance and the processing time is increased by removal of the increased allowance in the secondary processing. Regarding the lamination molding having a large allowance, the amount of the material powder necessary for the lamination molding also increases. In some cases, the secondary processing may be performed only to remove the warpage. Accordingly, the warpage causes an increase in the manufacturing cost of product.

SUMMARY

The present disclosure proposes a manufacturing method for three-dimensional molded object that reduces a warpage, a lamination molding apparatus, and a three-dimensional molded object in which the warpage is reduced.

The lamination molding apparatus of the present disclosure includes: a recoater head that uniformly spreads metal material powder on a modeling table at a predetermined height to form a material powder layer; a laser light irradiation device that irradiates the material powder layer with laser light, and heats and melts the material powder to form a sintered layer; and a control device that forms a sintered body, which is an three-dimensional molded object, by repeatedly driving and controlling the recoater head and the laser light irradiation device; the control device reads sintered body data, that is configured by the shape of a base part in which at least a plurality of support members with constricted central portion are arranged continuously and the shape of a main body part which is a final molded product, and drives and controls the laser light irradiation device and the recoater head to form the sintered body.

In addition, the manufacturing method for three-dimensional molded object of the present disclosure includes: a base part formation step for uniformly spreading metal material powder on a modeling table to form a material powder layer, irradiating an irradiation region of the material powder layer with laser light or electron beam, and heating and melting the material powder and then cooling and solidifying the material powder, to form a base part of a sintered body; and a main body part formation step for further uniformly spreading the metal material powder on the base part to form a material powder layer, irradiating an irradiation region of the material powder layer with laser light, heating and melting, and cooling and solidifying the material powder, to form a main body part of the sintered body; the base part formation step forms the base part by continuously forming a plurality of support members with constricted central portion on the modeling table.

Furthermore, the three-dimensional molded object of the present disclosure is configured by a base part in which a plurality of support members with constricted central portion are arranged continuously and a main body part which is a final molded product arranged integrally on the base part, and is formed of a sintered body made of metal or resin.

DESCRIPTION OF THE EMBODIMENTS

Figure 1:
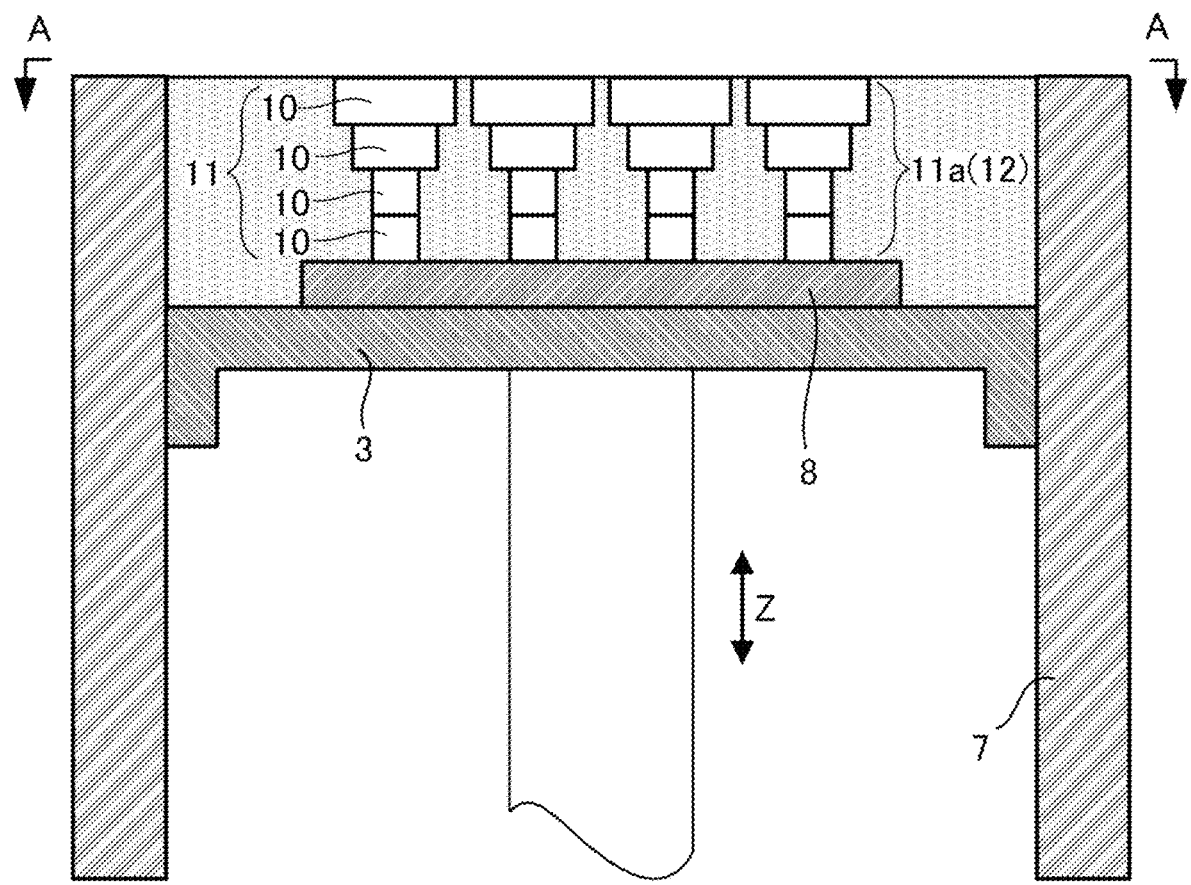
FIG. 1 is a main part enlarged view in a chamber of a lamination molding apparatus of an embodiment of the present disclosure, showing a state in which sintered layers are laminated to form a base part.
Figure 2:
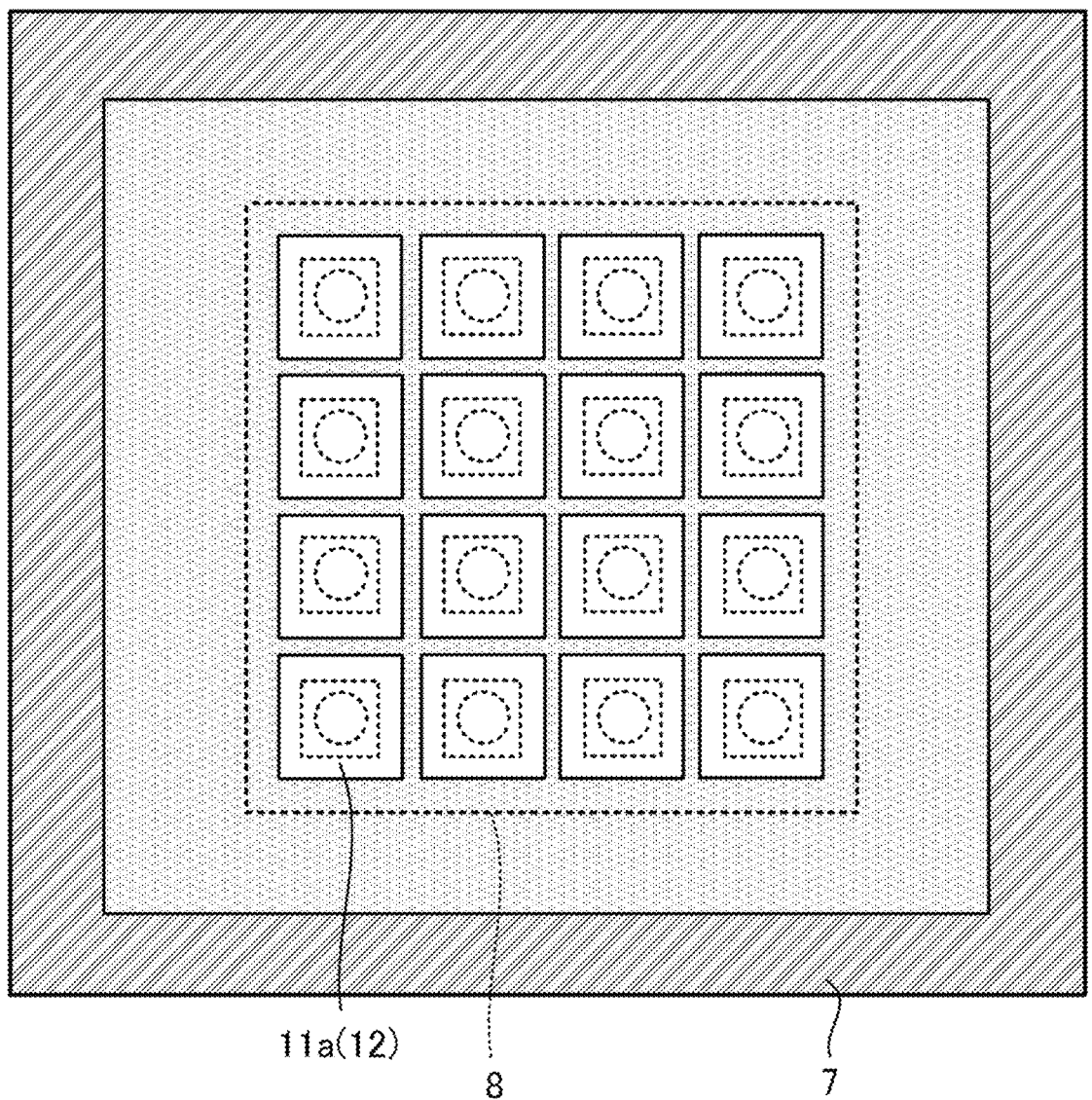
FIG. 2 is a diagram taken along an arrow A-A in FIG. 1.
Figure 3:
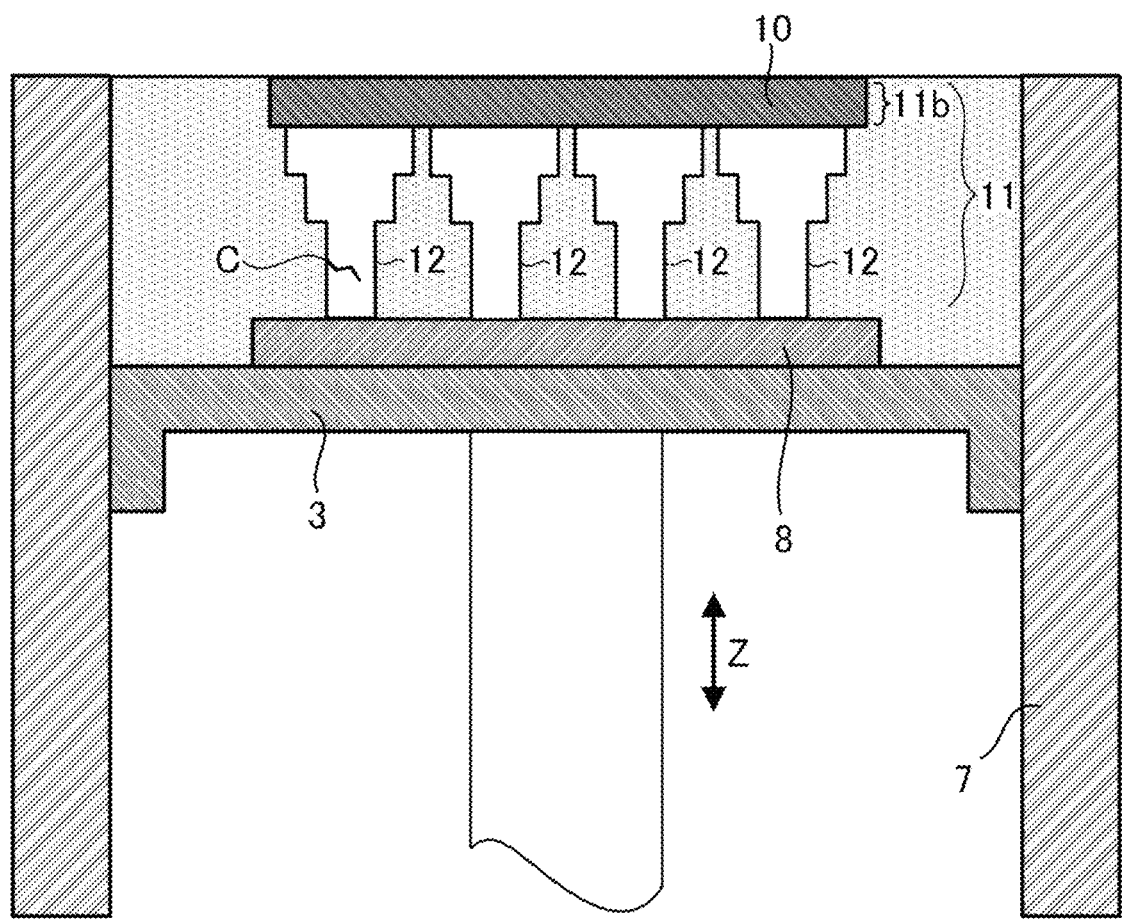
FIG. 3 is a main part enlarged view in the chamber of the lamination molding apparatus of the embodiment of the present disclosure, showing a state in which a sintered layer is formed on the base part.
Figure 4:
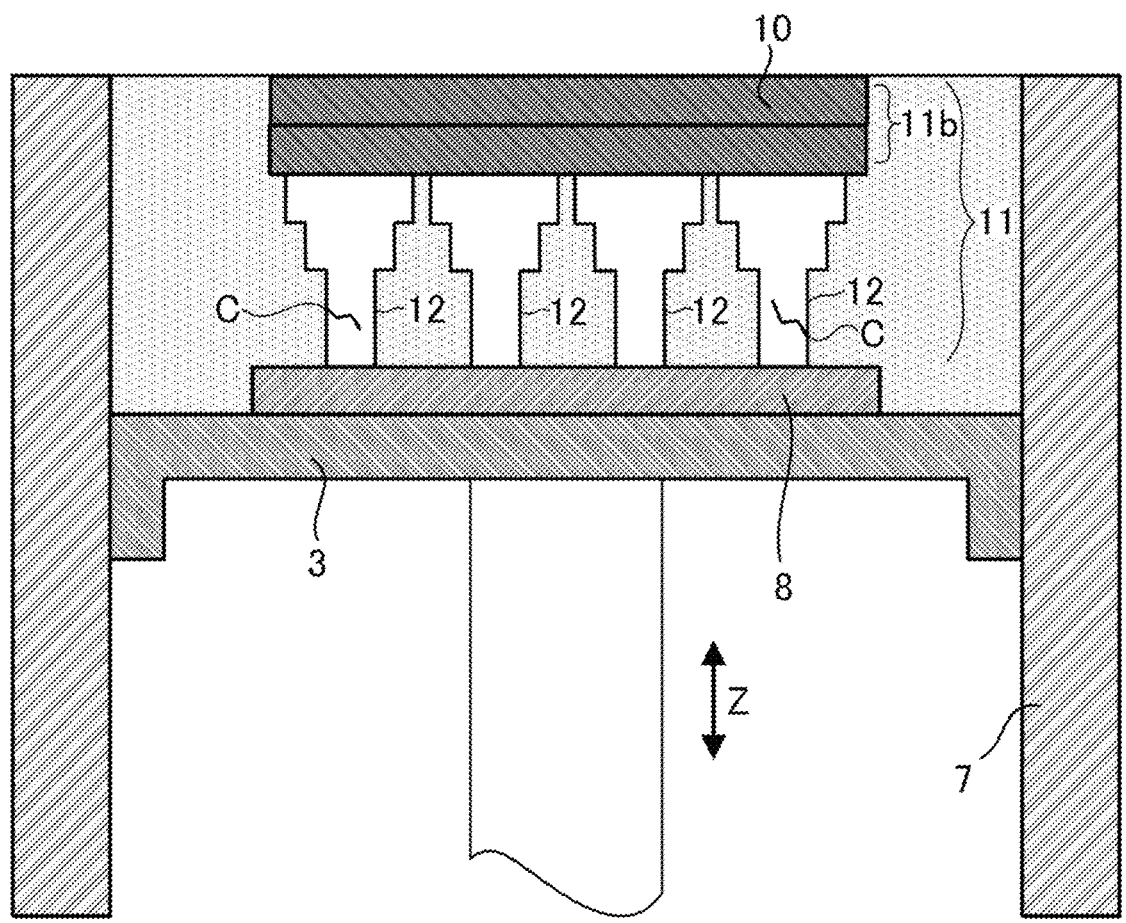
FIG. 4 is a main part enlarged view in the chamber of the lamination molding apparatus of the embodiment of the present disclosure, showing a state in which sintered layers are being laminated to form a main body part.
Figure 5:
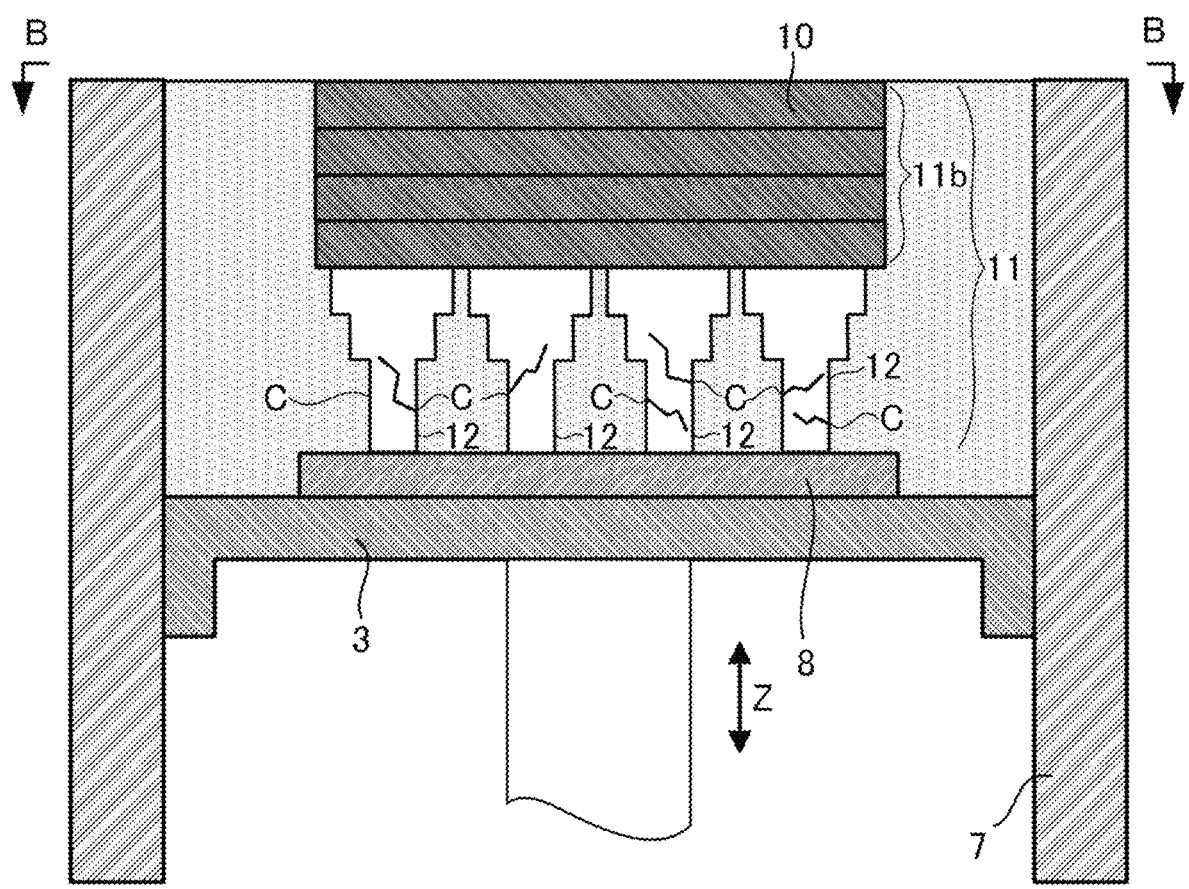
FIG. 5 is a main part enlarged view in the chamber of the lamination molding apparatus of the embodiment of the present disclosure, showing a state in which sintered layers are further laminated to form a main body part.
Figure 6:
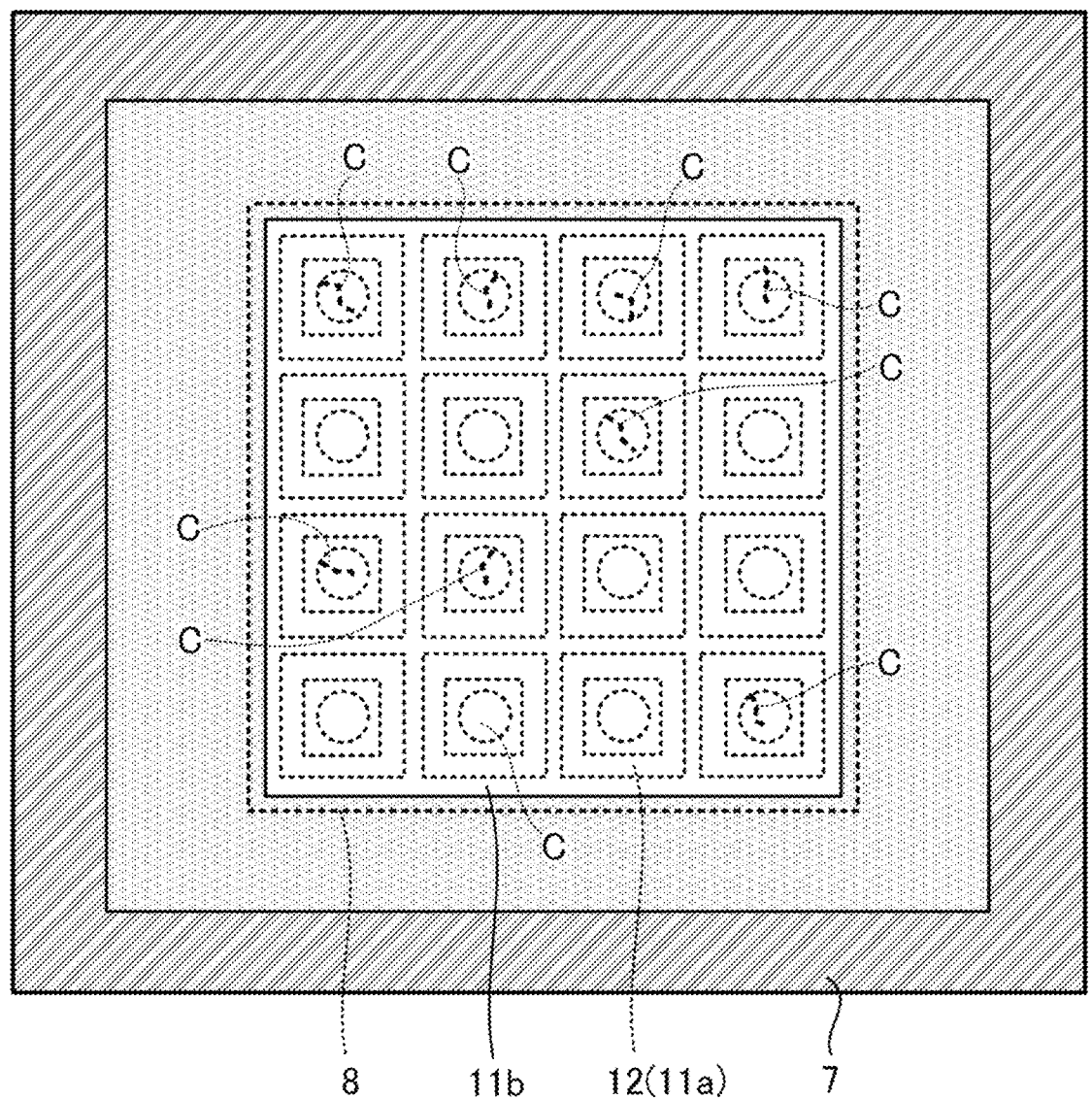
FIG. 6 is a diagram taken along an arrow B-B in FIG. 5.
Figure 7:
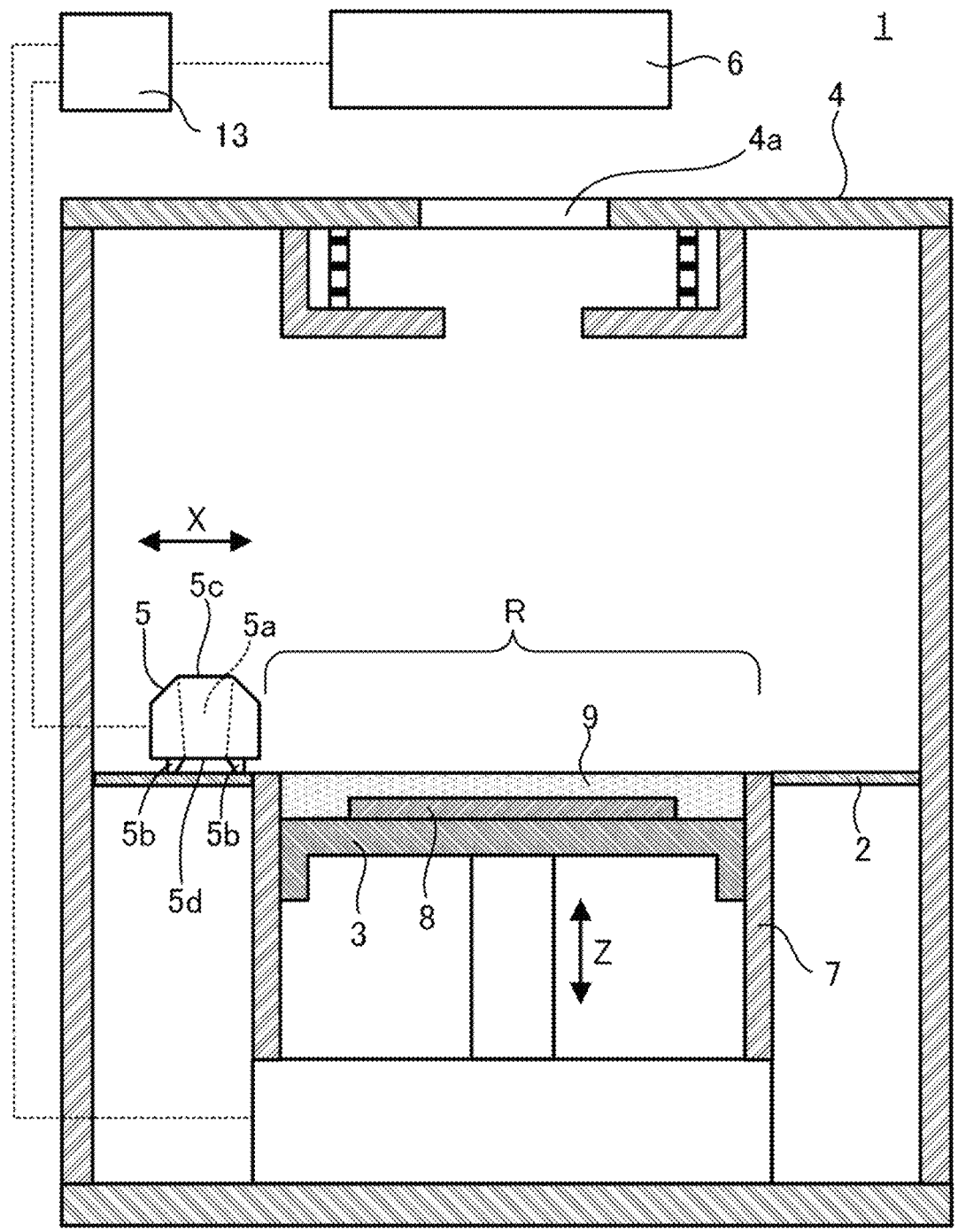
FIG. 7 is a schematic configuration diagram of the lamination molding apparatus of the embodiment of the present disclosure, showing a state in which a material powder layer is formed on a base plate.
Figure 8:
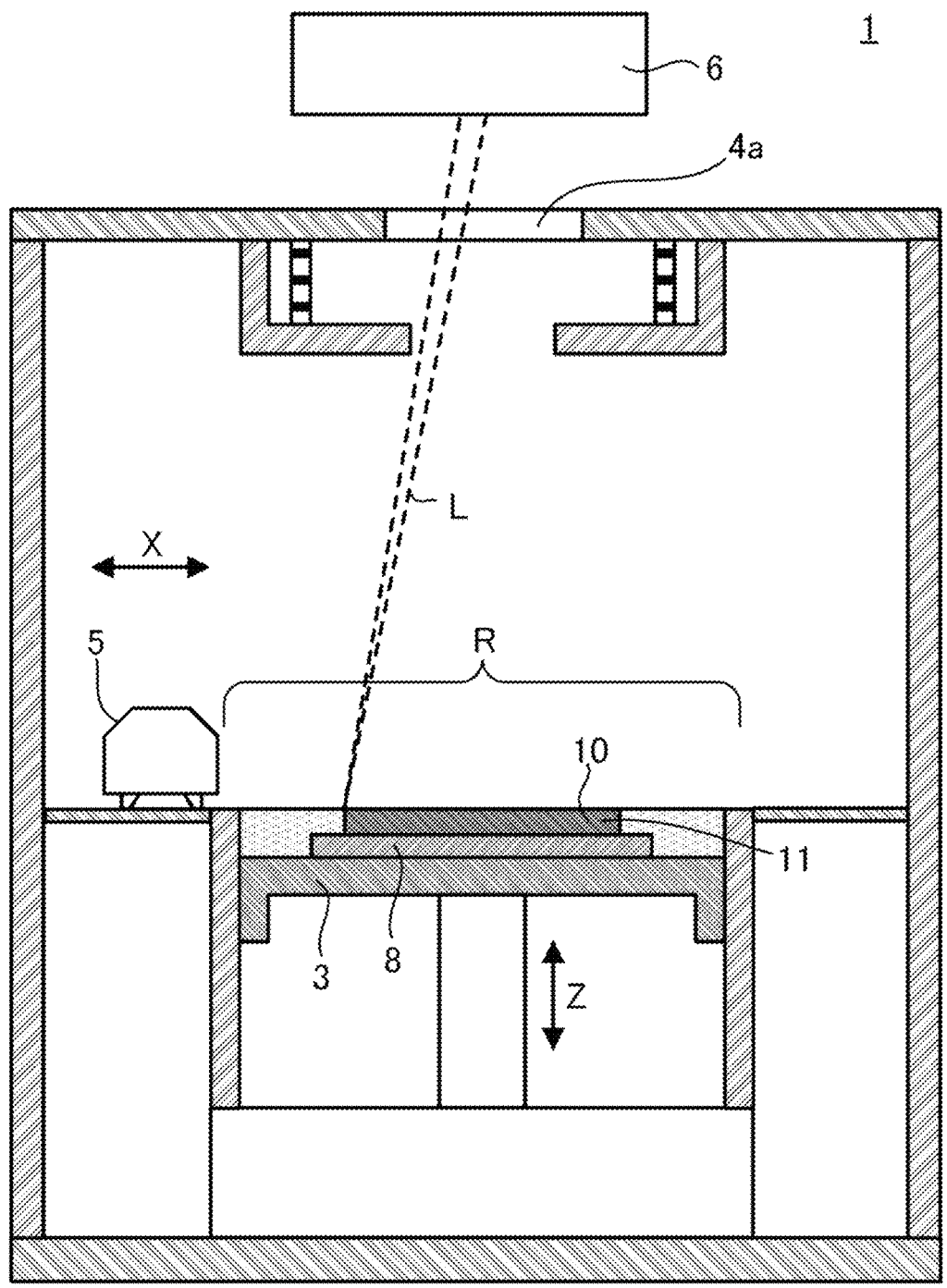
FIG. 8 is a schematic configuration diagram of the lamination molding apparatus of the embodiment of the present disclosure, showing a state in which a sintered layer is formed on the base plate.
Figure 9:
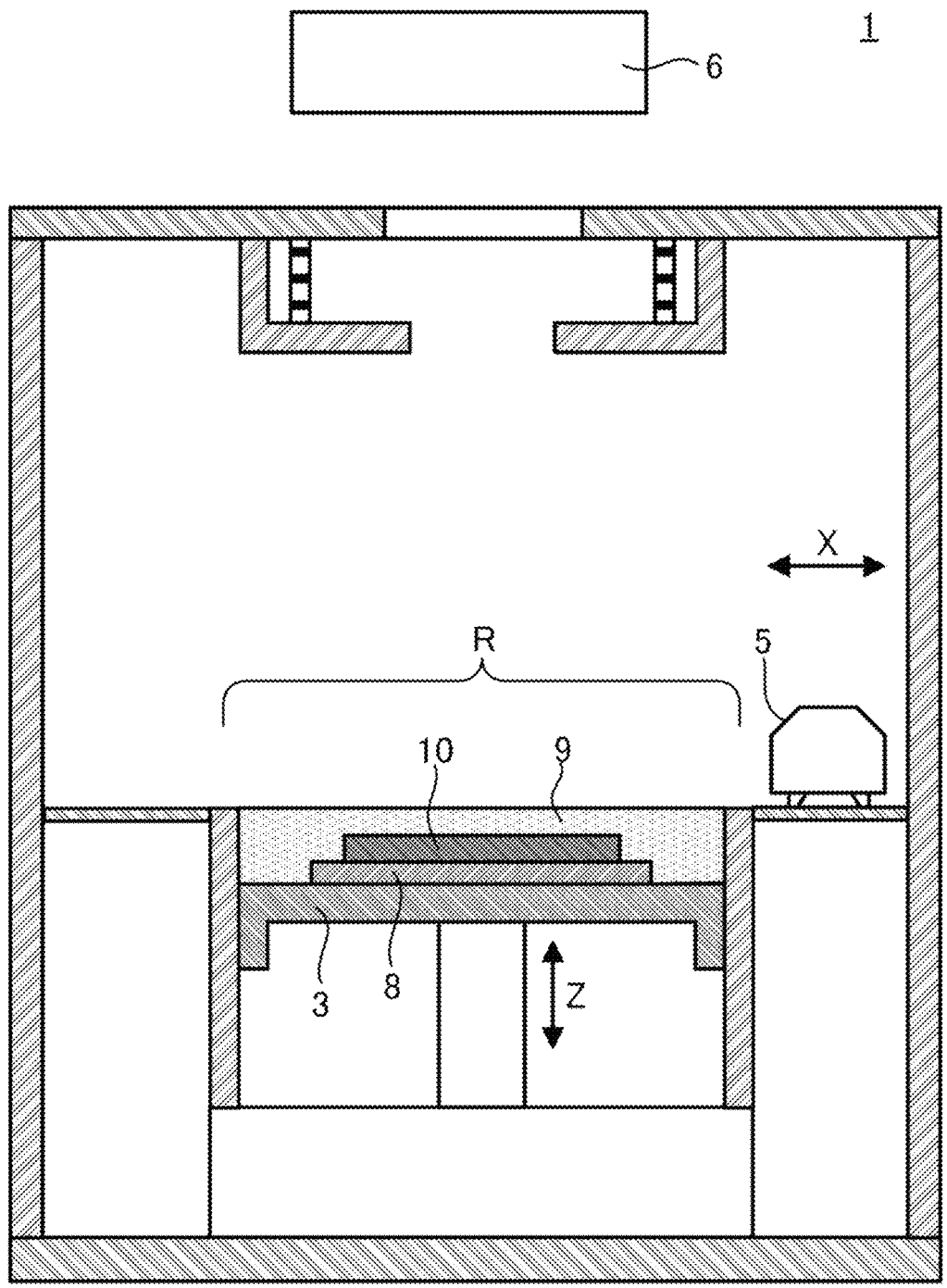
FIG. 9 is a schematic configuration diagram of the lamination molding apparatus of the embodiment of the present disclosure, showing a state in which the material powder layer is formed on the sintered layer.
Figure 10:
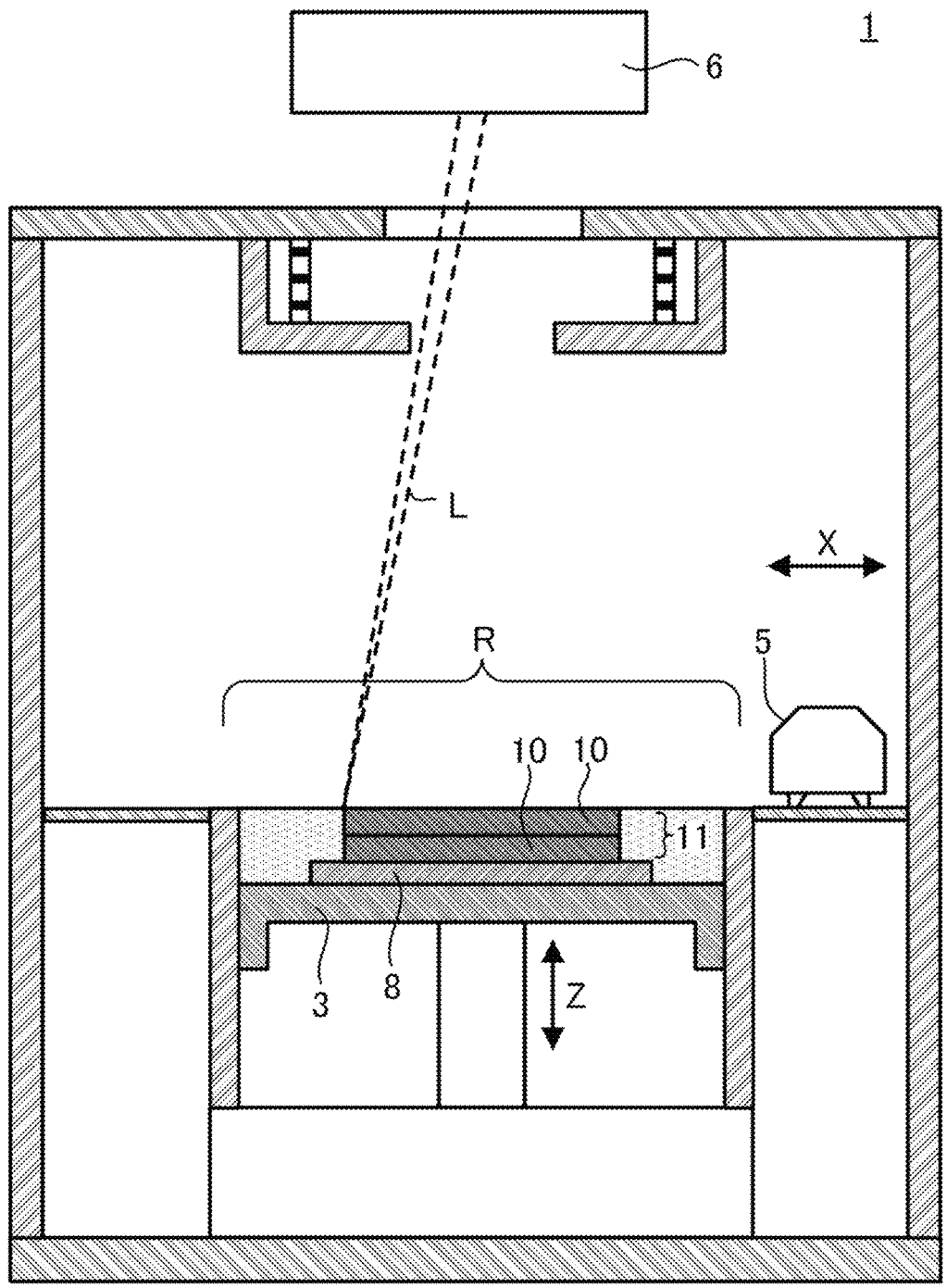
FIG. 10 is a schematic configuration diagram of the lamination molding apparatus of the embodiment of the present disclosure, showing a state in which sintered layers are laminated to form a sintered body.
Figure 11:
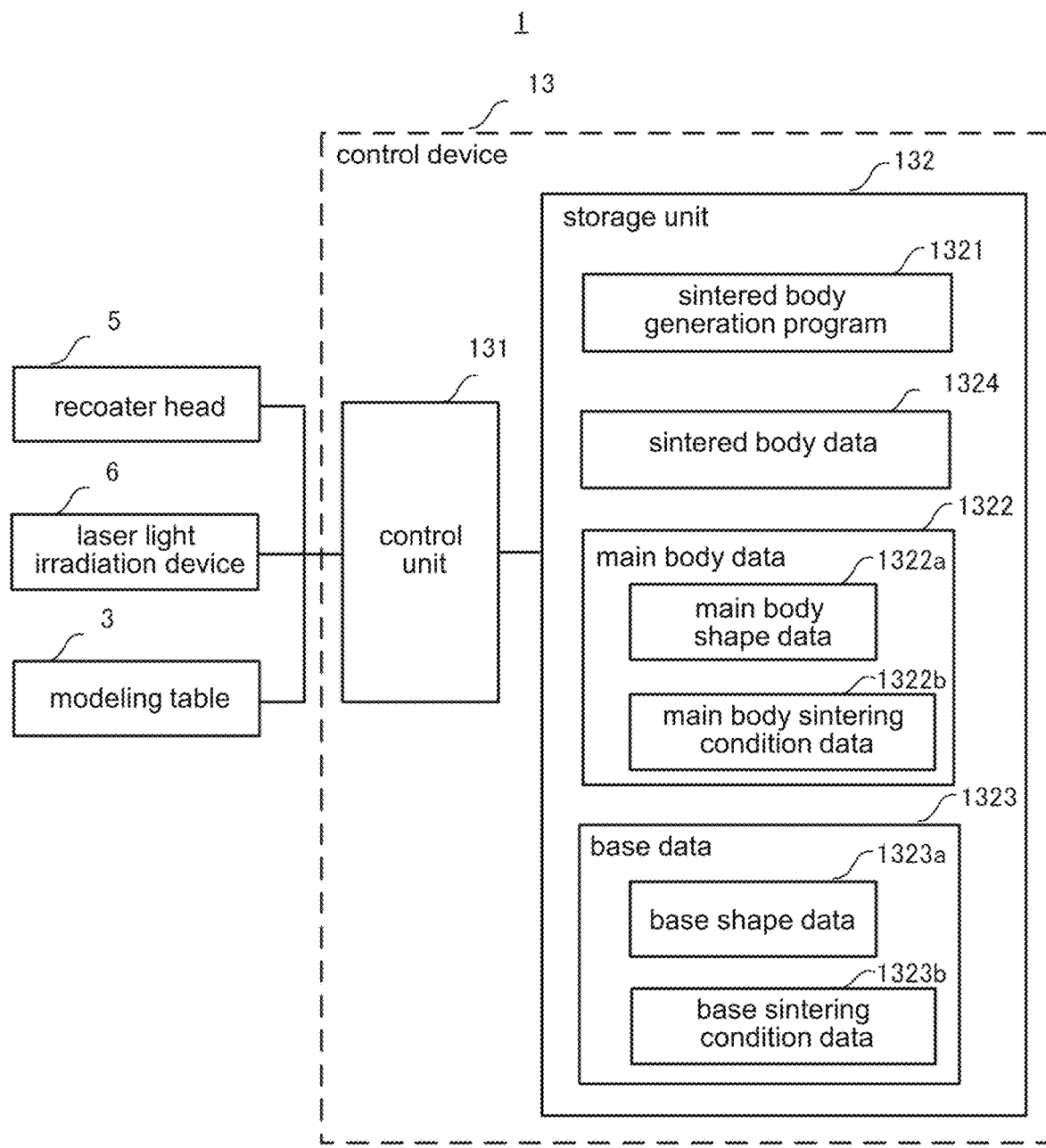
FIG. 11 is a schematic block diagram showing the lamination molding apparatus of the embodiment of the present disclosure.

Hereinafter, embodiments of the present disclosure are described in detail with reference to the drawings. FIG. 1 is a main part enlarged view in a chamber of a lamination molding apparatus, showing a state in which sintered layers are laminated to form a base part. FIG. 2 is a diagram taken along an arrow A-A in FIG. 1. FIG. 3 is a main part enlarged view in the chamber of the lamination molding apparatus, showing a state in which a sintered layer is formed on the base part. FIG. 4 is a main part enlarged view in the chamber of the lamination molding apparatus, showing a state in which sintered layers are being laminated to form a main body part. FIG. 5 is a main part enlarged view in the chamber of the lamination molding apparatus, showing a state in which sintered layers are further laminated to form a main body part. FIG. 6 is a diagram taken along an arrow B-B in FIG. 5. FIG. 7 is a schematic configuration diagram of the lamination molding apparatus, showing a state in which a material powder layer is formed on a base plate. FIG. 8 is a schematic configuration diagram of the lamination molding apparatus, showing a state or later in which a sintered layer is formed on the base plate. FIG. 9 is a schematic configuration diagram of the lamination molding apparatus, showing a state in which the material powder layer is formed on the sintered layer. FIG. 10 is a schematic configuration diagram of the lamination molding apparatus, showing a state in which sintered layers are laminated to form a sintered body. FIG. 11 is a schematic block diagram showing the lamination molding apparatus of the embodiment of the present disclosure. Besides, the left-right direction is an X-axis direction in FIG. 1. The front-rear direction is a Y-axis direction (not shown), and is a horizontal uniaxial direction orthogonal to the X-axis direction. The up-down direction is a Z-axis direction in FIG. 1. The thickness dimension of the material powder layer and the thickness dimension of the sintered layer shown in FIGS. 1 to 10 are shown larger than actual ones for the sake of description. The number of the sintered layers shown in FIGS. 1 to 6 is shown smaller for the sake of description.

The manufacturing method for three-dimensional molded object of the present disclosure is applied to a lamination molding apparatus 1 which models the three-dimensional molded object of the present disclosure. The lamination molding apparatus 1 shown in FIGS. 7 to 10 includes a base stand 2, a modeling table 3, a chamber 4, a recoater head 5, a laser light irradiation device 6, and a control device 13. The lamination molding apparatus 1 may include a cutting device that is not shown in the chamber 4. Instead of the laser light irradiation device 6, an electron beam irradiation device that is not shown may be included.

The base stand 2 includes the modeling table 3 and a powder holding wall 7. A modeling region R is formed on the modeling table 3. The modeling table 3 moves in the vertical direction (Z-axis direction) in the powder holding wall 7 according to an instruction from the control device 13. A base plate 8 is detachably mounted on the upper surface of the modeling table 3.

The chamber 4 covers the modeling region R. The inside of the chamber 4 is filled with inert gas of a predetermined concentration supplied from an inert gas supply device that is not shown. The inert gas is gas that does not react with material powder. The inert gas is, for example, nitrogen gas.

The recoater head 5 includes a material accommodation tank 5a and a pair of blades 5b, 5b. The recoater head 5 moves in the left-right direction (X-axis direction) above the modeling table 3 according to an instruction from the control device 13. The recoater head 5 evacuates to a position passing above the modeling table 3. The evacuation positions of the recoater head 5 are on the right and left sides of the modeling table 3.

The material accommodation tank 5a is formed inside the recoater head 5. The material accommodation tank 5a respectively communicates with a material supply port 5c formed in the upper part of the recoater head 5 and a material discharge port 5d formed in the lower part of the recoater head 5.

The material supply port 5c is connected to a material replenishing device that is not shown in a timely manner. The material replenishing device replenishes the recoater head 5 with material powder. The material discharge port 5d is formed to be elongated in the front-rear direction (Y-axis direction) orthogonal to the movement direction of the recoater head 5, and discharges the material powder onto the modeling table 3. The material powder is, for example, spherical metal powder having an average particle diameter of 20 μm. The metal powder is, for example, iron powder. In addition, the material powder may also use a nonmetallic powder material such as resin or the like.

The pair of blades 5b, 5b protrudes from the lower part of the recoater head 5, and is respectively arranged on the left and right sides with the material discharge port 5d sandwiched therebetween. The pair of blades 5b, 5b flattens the material powder discharged from the material discharge port 5d.

The laser light irradiation device 6 is arranged above the chamber 4. Laser light L output from the laser light irradiation device 6 passes through a protection window 4a arranged in the chamber 4, and is irradiated to the modeling region R. The laser light irradiation device 6 includes a laser light source, a two-axis galvanometer mirror, and a spot diameter adjustment device.

The laser light source outputs the laser light L capable of heating and melting the material powder. The laser light L is, for example, an yttrium aluminum garnet (YAG) laser, a fiber laser, a carbon dioxide laser, or the like.

The spot diameter adjustment device focuses the laser light L output from the laser light source and adjusts the laser light L to a desired spot diameter.

The two-axis galvanometer mirror two-dimensionally scans the laser light L output from the laser light source in a controllable manner, and irradiates the laser light L to a desired position in the modeling region R.

The protection window 4a is formed of a material that can transmit the laser light L. When the laser light L is a YAG laser, a fiber laser, or a carbon dioxide laser, the protective window 4a can be made of, for example, quartz glass.

The control device 13 is a device that controls the recoater head 5, the laser light irradiation device 6, and the modeling table 3 included in the lamination molding apparatus 1, and is implemented by, for example, a general-purpose information processing device such as a personal computer, a workstation or the like. The control device 13 includes a control unit 131 and a storage unit 132.

The control unit 131 includes a CPU (Central Processing Unit), a ROM (Read Only Memory), a RAM (Random Access Memory) and the like, and controls various devices included in the lamination molding apparatus 1. In addition, the control unit 131 reads main body data 1322 and base data 1323 stored in the storage unit 132 and executes a sintered body generation program 1321, to thereby generate sintered body data 1324 for generating a sintered body.

The storage unit 132 is a storage medium that stores various data and programs, and stores the main body data 1322, the base data 1323, the sintered body data 1324, and the sintered body generation program 1321.

The main body data 1322 is data relating to a main body part 11b, which is a final molded product such as a mold or the like, and includes main body shape data 1322a and main body sintering condition data 1322b.

The main body shape data 1322a is three-dimensional shape data of the final molded product that is the main body part 11b, and is solid data such as three-dimensional CAD or the like. Besides, the solid data refers to three-dimensional data indicating the shape and dimension of the main body part 11b.

The main body sintering condition data 1322b is data relating to laser irradiation conditions used for sintering the main body part 11b, which is, for example, data such as a laser output value, a laser scanning speed, a lamination pitch, a laser spot diameter or the like.

The base data 1323 is data relating to a base part 11a arranged below the main body part 11b; when the base part 11a and the main body part 11b are combined to form a sintered body 11, the base data 1323 is created with such strength that a crack C are generated in at least a part of the base part 11a due to the stress generated in the sintered body 11. Here, the crack C indicates a chap or a fissure.

The base data 1323 includes base shape data 1323a and base sintering condition data 1323b.

The base shape data 1323a is three-dimensional shape data of the base part 11a and is solid data such as three-dimensional CAD or the like.

In addition, the base sintering condition data 1323b is data relating to laser irradiation conditions used for sintering the base part 11a, which is, for example, data such as a laser output value, a laser scanning speed, a lamination pitch, a laser spot diameter, or the like.

The sintered body data 1324 is modeling data for creating the sintered body 11 in which the main body part 11b is joined to the base part 11a.

The modeling data indicates an operation procedure of each device constituting the lamination molding apparatus when modeling a predetermined modeled object, and includes, for example, coordinate data of a laser irradiation region. The coordinate data of the laser irradiation region is used to define, for each layer, an irradiation region of the laser irradiated from the laser light irradiation device 6 toward the powder layer.

The sintered body generation program 1321 is a program for generating the sintered body 11, which is a three-dimensional molded object, from the main body data 1322 and the base data 1323.

Specifically, at least one of the base shape data 1323a and the base sintering condition data 1323b is selected or automatically generated from at least one of the main body shape data 1322a and the main body sintering condition data 1322b, and from the selected or automatically generated base shape data 1323a and base sintering condition data 1323b, and the main body shape data 1322a and the main body sintering condition data 1322b stored in the storage unit 132, the sintered body data 1324 which is modeling data is generated, and is stored in the storage unit 132.

Here, the sintered body generation program 1321 of the present disclosure is described in detail.

In the present disclosure, the control unit 131 determines the shape and the sintering conditions of the base part 11a with the sintered body generation program 1321, so as to obtain such strength that the crack C is generated in at least a part of the base part 11a when the base part 11a and the main body part 11b are combined to form the sintered body 11.

This is because no stress remains in the formed sintered body 11 when the crack C is formed in at least a part of the base part 11a during the formation of the sintered body 11. Accordingly, it is possible to reduce the warpage of the main body part 11b after being separated from the base plate 8 and the base part 11a.

For example, the residual stress is generated due to the indirect fixation of the bottom surface of the main body part 11b to the base plate 8, and thus the residual stress remaining in the sintered body 11 increases when the size (modeling size) of the bottom surface of the main body part 11b is large, and the generated warpage also increases. Similarly, the larger the number of lamination times is, the larger the stress remaining in the sintered body 11 is.

When the strength of the base part 11a is too small with respect to the residual stress of the main body part 11b, the base part 11a collapses immediately during the formation of the sintered body 11 and the sintered body 11 is formed difficultly; on the other hand, when the strength of the base part 11a is too large with respect to the residual stress of the main body part 11b, the crack C is not generated in the base part 11a and thus the residual stress of the main body part 11b cannot be released.

Thus, the control unit 131 uses at least one of the main body shape data 1322a and the main body sintering condition data 1322b to calculate the residual stress by the sintered body generation program 1321, and determines such strength (shape, sintering conditions) of the base part 11a that the crack C is appropriately generated in the base part 11a.

Figure 17:
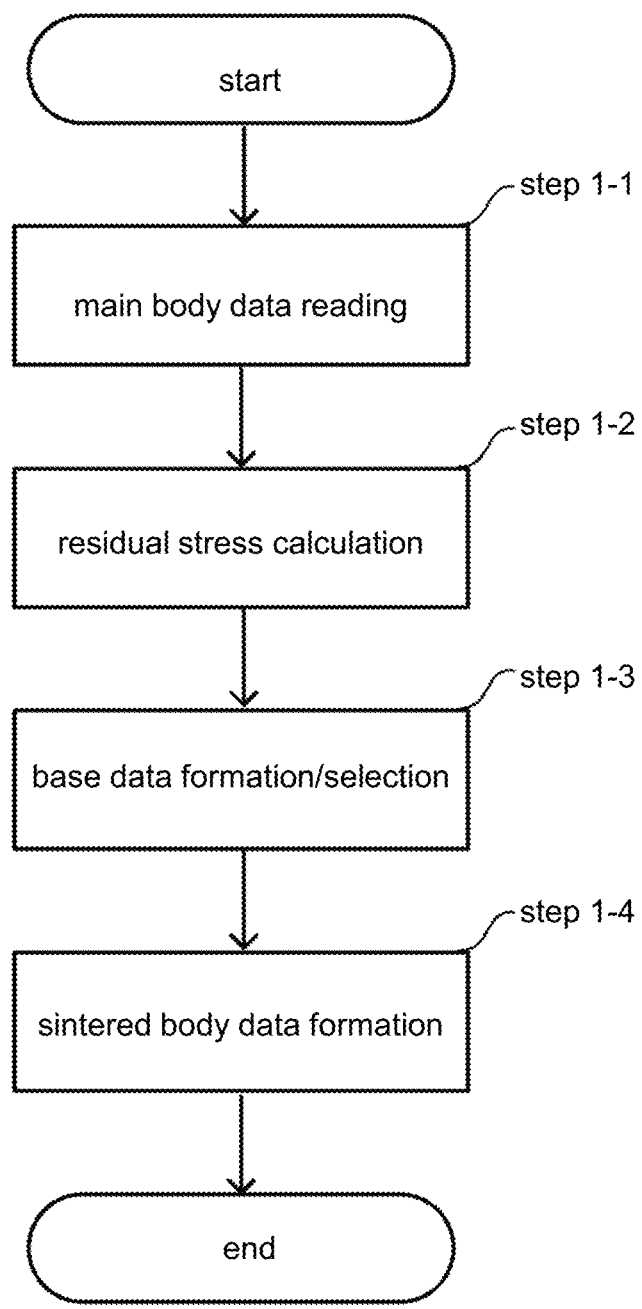
FIG. 17 is a flowchart showing a calculation flow of a sintered body generation program of the embodiment of the present disclosure.

FIG. 17 is a flowchart showing a calculation flow of the sintered compact generation program of the embodiment of the present disclosure.

The control unit 131 reads at least one of the main body shape data 1322a and the main body sintering condition data 1322b stored in the storage unit 132 (step 1-1), and calculates the magnitude of the residual stress of the main body part 11b (step 1-2).

Next, according to the calculated magnitude of the residual stress of the main body part 11b, at least one of the base shape data 1323a and the base sintering condition data 1323b in which the crack C is generated during the formation of the sintered body 11 is automatically generated. Alternatively, among the base data 1323 stored in the storage unit 132, the base data 1323 corresponding to the magnitude of the residual stress of the main body part 11b is selected (step 1-3).

Then, the sintered body data 1324 is generated from the body data 1322 and the base data 1323 described above, and is stored in the storage unit 132 (step 1-4).

The strength of the base part 11a can be adjusted according to the shape of the base part 11a. As shown in FIGS. 1 to 6, the base part 11a may be formed of a plurality of support members 12 standing on the base plate 8. At this time, the crack C or the break may be generated in at least one of the plurality of support members 12.

For example, as shown in FIGS. 1 and 2, sintered layers 10 are laminated to form the plurality of support members 12 on the base plate 8. As shown in FIGS. 3 to 6, the sintered layers 10 are further laminated to form the main body part 11b on the plurality of support members 12. The crack C is generated in at least one support member 12 due to the stress generated in the main body part 11b during the formation every time the sintered layers 10 are laminated. Besides, the crack C is not always generated in the support member 12 every time the sintered layers 10 are laminated. For example, each support member 12 may be formed with such strength that the crack C is generated in at least one support member 12 due to the generation of a stress equal to or more than a predetermined magnitude in the sintered body 11. In the process of lamination of the sintered layers 10, when a stress smaller than a predetermined magnitude is gradually accumulated in the sintered body 11 and the stress remaining in the sintered body 11 exceeds the predetermined magnitude, the crack C may be generated in one support member 12.

The strength of each support member 12 can be adjusted according to the shape of each support member 12; for example, as shown in FIGS. 1 and 2, each support member 12 may be configured to form a cylinder on the base plate 8 and form an inverted truncated pyramid on the cylinder.

The strength of each support member 12 can be adjusted according to the size of each support member 12. The predetermined strength of each support member 12 can be adjusted according to the distance between the support members 12. The predetermined strength of each support member 12 can be adjusted according to the number of support members 12 that is determined by the size of each support member 12 and the distance between the support members 12.

In addition, the strength of the base part 11a can be adjusted by changing the base sintering condition data 1323b to thereby change the density of the sintered layer 10. The base part 11a may be formed of the sintered layer 10 having a low density and may be formed in a porous shape. The base part 11a may be formed of the sintered layer 10 having a lower density than that of the main body part 11b.

The sintered layer 10 having a low density can be formed by reducing the output of the laser light L irradiated to a material powder layer 9, shortening the time of irradiating the laser light L, increasing the spot diameter of the laser light L, or the like. Conversely, the sintered layer 10 having a high density can be formed by increasing the output of the laser light L irradiated to the material powder layer 9, increasing the time of irradiating the laser light L, reducing the spot diameter of the laser light L, or the like.

The strength of the base part 11a can be adjusted according to the shape of a plurality of holes formed in the base part 11a. The predetermined strength of the base part 11a can be adjusted according to the size of the plurality of holes formed in the base part 11a. The predetermined strength of the base part 11a can be adjusted according to the number of the plurality of holes formed in the base part 11a. The plurality of holes formed in the base part 11a can be freely formed by lamination molding.

The strength of the base part 11a may be adjusted by a combination of the various adjustment methods described above, and the base part 11a may be formed with such predetermined strength that the crack C is generated and then broken in a stepwise manner.

The basic operation of the lamination molding apparatus 1 of the present disclosure is as follows.

First, a preparation step is performed. Specifically, the control unit 131 reads at least one of the main body shape data 1322a and the main body sintering condition data 1322b stored in the storage unit 132, calculates the magnitude of the residual stress of the main body part 11b, automatically generates or selects the base data 1323 in which the crack C is formed during the formation of the sintered body 11, and generates the sintered body data 1324.

Thereafter, the detachable base plate 8 is mounted on the modeling table 3. The controller 131 moves the modeling table 3 so that the height of the upper surface of the base plate 8 is equal to the height of the front end of the blade 5b.

Next, a recoating step is performed. The control unit 131 lowers the modeling table 3 by a height corresponding to the thickness of the material powder layer 9, and moves the recoater head 5 from the evacuation position through the upward of the modeling table 3 to an evacuation position on the opposite side. As shown in FIG. 7, the material powder layer 9 is formed on the base plate 8. The metal material powder can be uniformly spread on the base plate 8 at a predetermined height.

Next, a sintering step is performed. The control unit 131 uses the laser light irradiation device 6 to irradiate a predetermined irradiation region of the material powder layer 9 with the laser light L according to the sintered body data 1324. As shown in FIG. 8, the sintered layer 10 is formed on the base plate 8. The sintered layer 10 and the base plate 8 are fixed.

The recoating step is performed again. The control unit 131 lowers the modeling table 3 by a height corresponding to the thickness of the material powder layer 9. The recoater head 5 is moved from the evacuation position through the upward of the modeling table 3 to an evacuation position on the opposite side. As shown in FIG. 9, a new material powder layer 9 is formed on the previous sintered layer 10.

The sintering step is performed again. The control unit 131 uses the laser light irradiation device 6 to irradiate a predetermined irradiation region of the material powder layer 9 with the laser light L according to the sintered body data 1324. A new sintered layer 10 is formed on the previous sintered layer 10. As shown in FIG. 10, the new sintered layer 10 and the previous sintered layer 10 are fixed. The lamination molding apparatus 1 repeats the recoating step and the sintering step to form the base part 11a of the sintered body 11 on the modeling table 3 (base part formation step), and forms the main body part 11b of the sintered body 11 on the base part 11a (main body part formation step), to form the sintered body 11 and obtain a desired three-dimensional molded object.

Furthermore, the lamination molding apparatus may perform a cutting step for cutting the sintered body 11 every time a predetermined number of the sintered layers 10 are laminated.

Example 1

Figure 12:
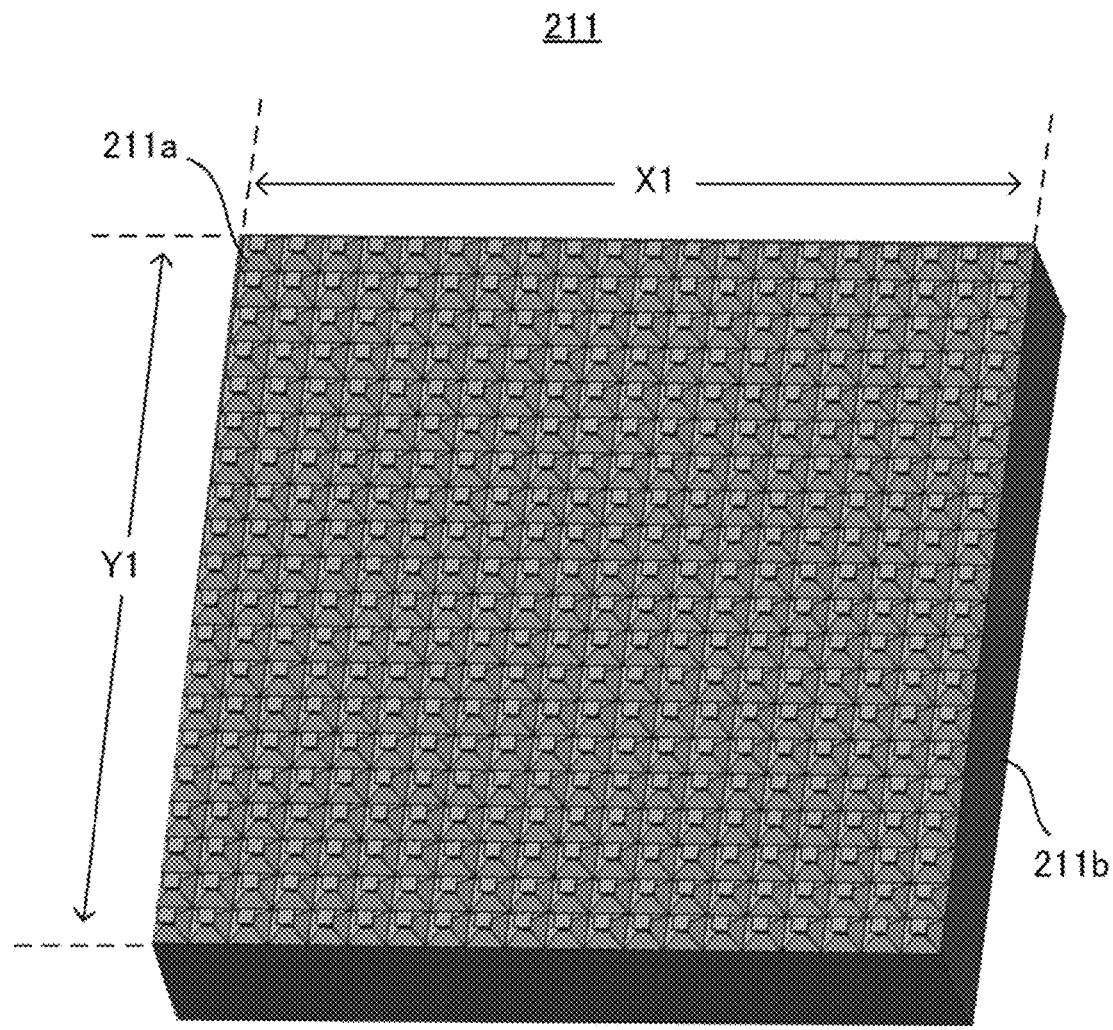
FIG. 12 is a schematic perspective view showing a state in which the sintered body of the embodiment of the present disclosure is viewed from the bottom surface direction.
Figure 13:
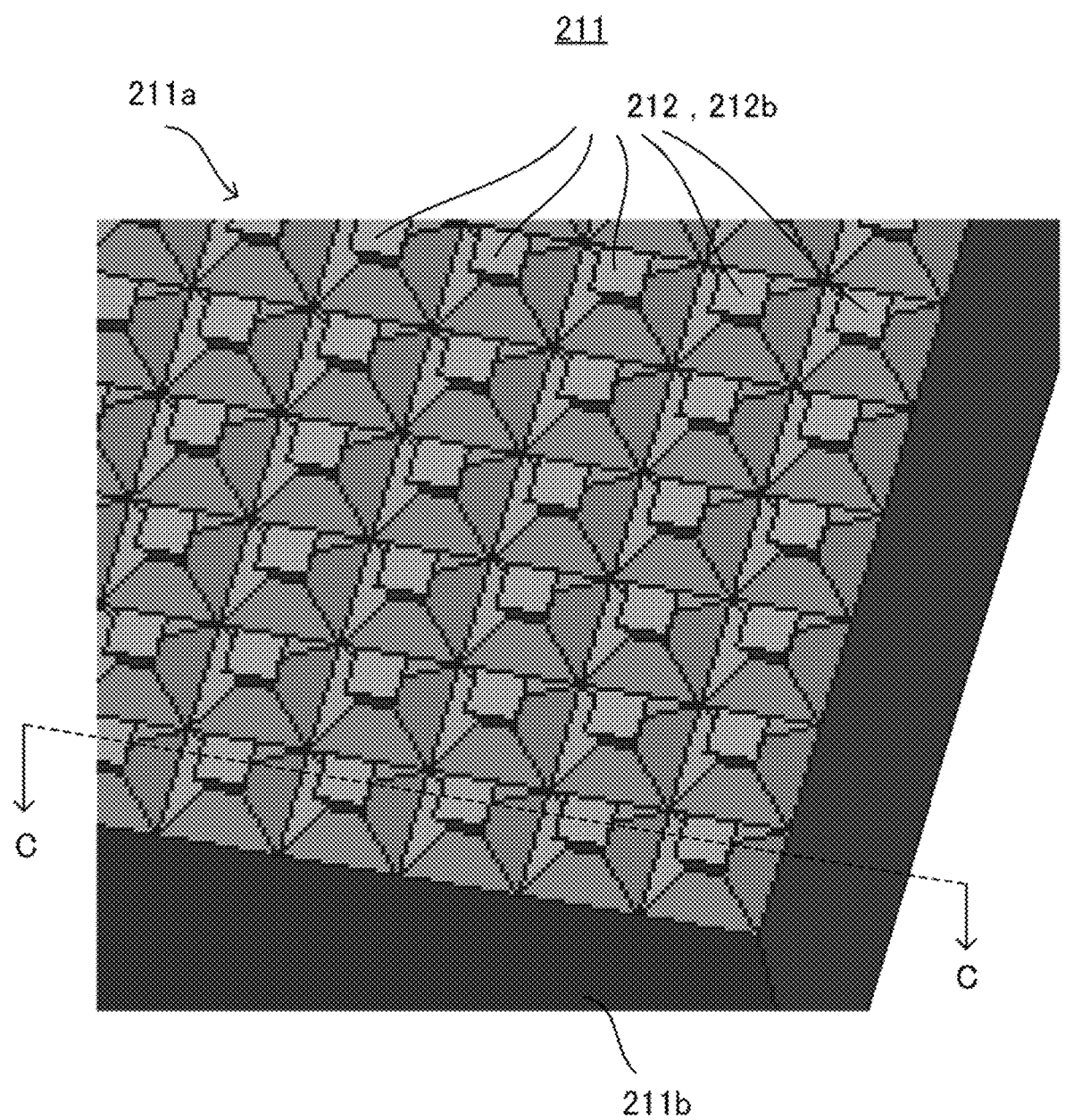
FIG. 13 is an enlarged view of FIG. 12.
Figure 14:
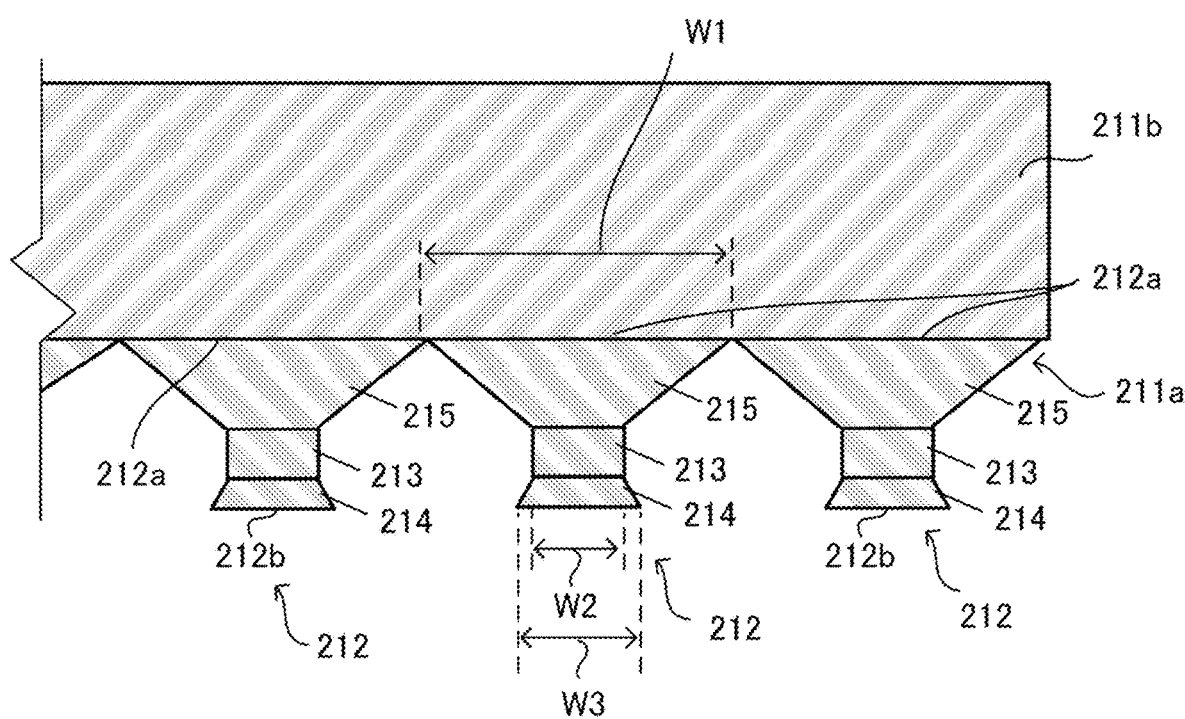
FIG. 14 is a diagram taken along a cross section C-C in FIG. 13.
Figure 15:
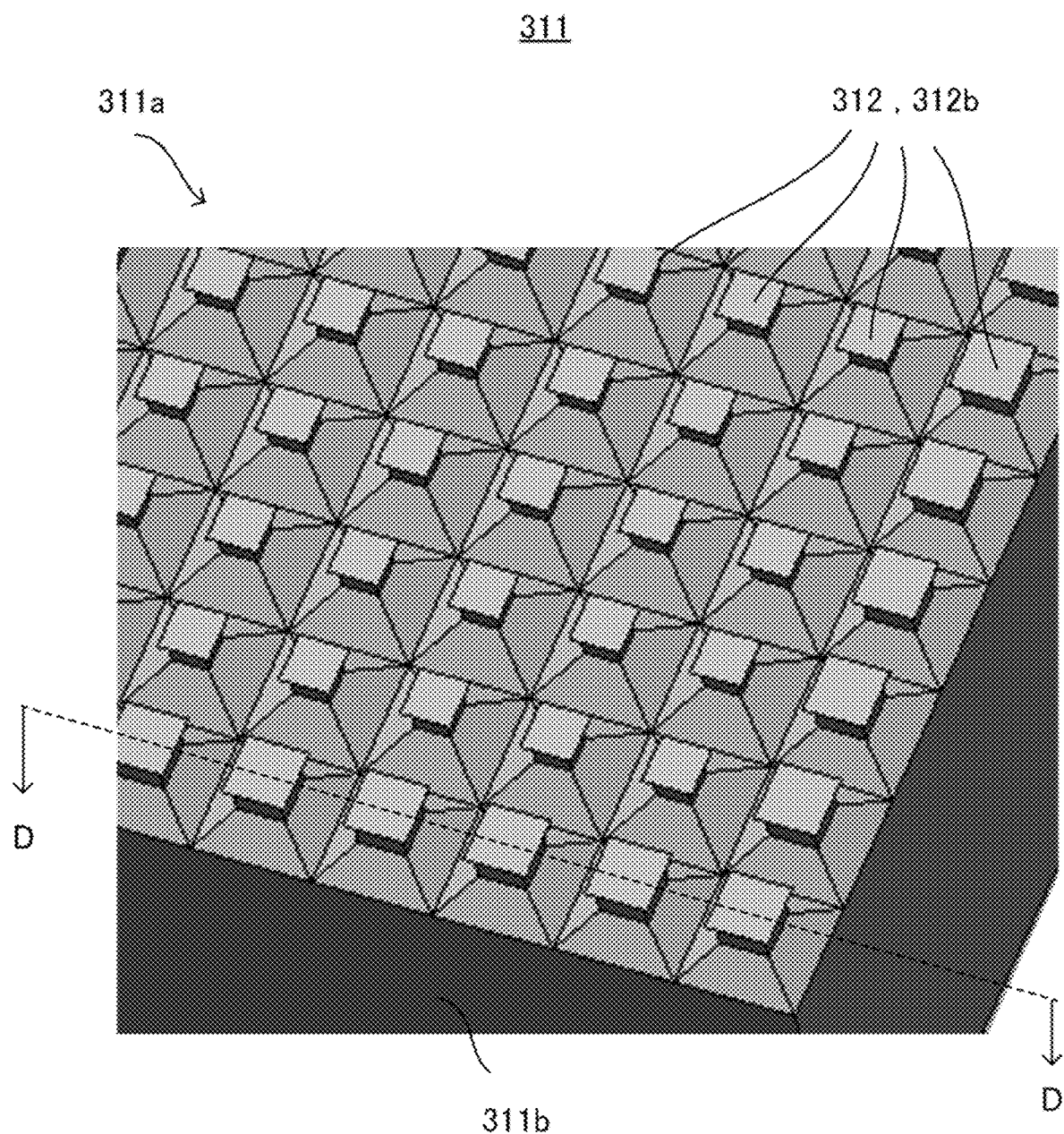
FIG. 15 is an enlarged view of a schematic perspective view showing a state in which another example of the sintered body of the embodiment of the present disclosure is viewed from the bottom surface direction.
Figure 16:
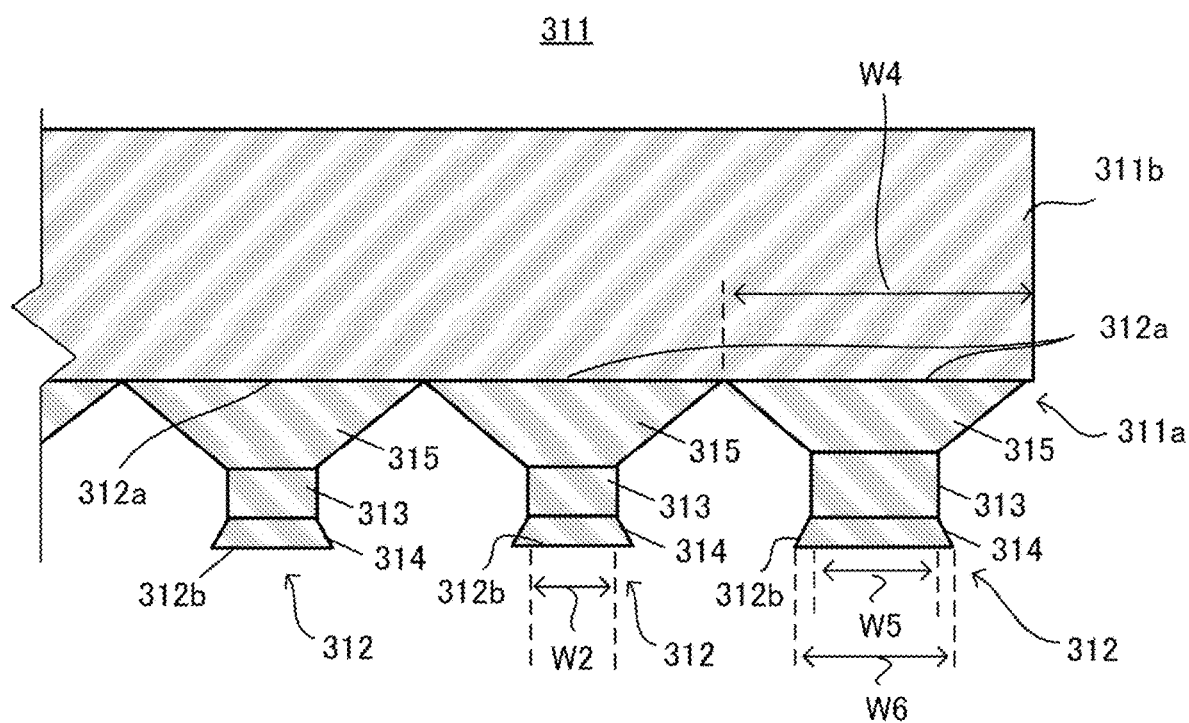
FIG. 16 is a diagram taken along a cross section D-D in FIG. 15.

FIG. 12 is a schematic perspective view showing a state in which the sintered body of the embodiment of the present disclosure is viewed from the bottom surface direction. FIG. 13 is an enlarged view of FIG. 12. FIG. 14 is a diagram taken along a cross section C-C in FIG. 13, and FIG. 15 is an enlarged view of a schematic perspective view showing a state in which another example of the sintered body of the embodiment of the present disclosure is viewed from the bottom surface direction. FIG. 16 is a diagram taken along a cross section D-D in FIG. 15, and FIG. 17 is a flowchart showing a calculation flow of a sintered body generation program of the embodiment of the present disclosure.

Sintered bodies 211 and 311 of the present disclosure are those such that the cracks C are generated in base parts 211a and 311a during sintering by modifying the shapes of the base parts 211a and 311a, and are formed of main body parts 211b and 311b and the base parts 211a, 311a (FIGS. 12 and 1).

The base parts 211a and 311a are formed by continuously disposing a plurality of support members 212 and 312 on an XY plane, and the support members 212 and 312 include upper parts 215 and 315, central parts 213 and 313, and lower parts 214 and 314.

The shape of the upper parts 215 and 315 is an inverted truncated pyramid shape, and the upper bottom surfaces of the upper parts 215 and 315 are upper surfaces 212a and 312a of the support members 212 and 312, and are surfaces joined to the main body parts 211b and 311b.

In addition, the central parts 213 and 313 are formed in a prism shape having the same cross section as the lower bottom surfaces of the upper parts 215 and 315, and the lower bottom surfaces of the upper parts 215 and 315 and the upper surfaces of the central parts 213 and 313 are joined.

Furthermore, the lower parts 214 and 314 have a truncated pyramid shape in which the upper bottom surfaces have the same shape as the bottom surfaces of the central parts 213 and 313, and the bottom surfaces of the central parts 213 and 313 are joined to the upper bottom surfaces of the lower parts 214 and 314. The lower bottom surfaces of the lower parts 214 and 314 are bottom surfaces 212b and 312b of the support members 212 and 312, and are surfaces fixed to the base plate 8.

In addition, the areas of the lower bottom surfaces of the lower parts 214 and 314 are formed smaller than the areas of the upper bottom surfaces of the upper parts 215 and 315 (W1>W3, W4>W6). Here, W1 and W4 are lengths of one side of the upper bottom surfaces of the upper parts 215 and 315, and W3 and W6 are lengths of one side of the lower bottom surfaces of the lower parts 214 and 314.

As described above, the support members 212 and 312 are formed in a constricted shape that gradually decreases from the upper surfaces 212a and 312a and the bottom surfaces 212b and 312b to the central parts 213 and 313 of the support members 212 and 312, and thus the cracks C are generated easily at the central positions of the support members 212 and 312.

Furthermore, the areas of the bottom surfaces 212b and 312b of the support members 212, 312 are formed smaller than the areas of the upper surfaces 212a and 312a, and thus the main body parts 211b and 311b can be stably supported by the upper surfaces 212a and 312a, and the residual stress is accumulated difficultly in the main body parts 211b and 311b because the fixation range between the bottom surfaces 212b and 312b and the base plate 8 is small.

The base part 211a is a base used when the modeling size (X1×Y1), which is the size of the bottom surface of the main body part 211b, is included in a range of 50 mm (X1)×50 mm (Y1), and the plurality of support members 212 have the same shape.

In addition, the base part 311a is a base used when the modeling size (X2×Y2), which is the size of the bottom surface of the main body part 311b, is larger than 50 mm×50 mm and is included in a range of 75 mm (X2)×75 mm (Y2); only one row of the support members 312 arranged on the outermost periphery of the base part 311a are formed with the cross-sectional area of the central part 313 larger than the cross-sectional areas of the other support members 312

(W5>W2). Here, W2 and W5 are lengths of one side of the cross section of the central part 313.

Since only one row of the support members 312 arranged on the outermost periphery are formed with a larger cross-sectional area of the central part 313, the base part 311a can generate the crack C without collapse even if the molding size of the main body part 311b becomes large.

Here, the basic operation of the lamination molding apparatus 1 of the example is as follows.

The control unit 131 first calculates the modeling size, which is the magnitude of the residual stress, from the main body shape data 1322a stored in the storage unit 132 as a preparatory step, and selects the base data 1323 in which the crack C is generated during the formation of the sintered body 11. Here, when the modeling size is included in the range of 50 mm×50 mm, the shape of the base part 211a is selected, and when the modeling size is larger than 50 mm×50 mm and included in the range of 75 mm×75 mm, the shape of the base part 311a is selected. Then, the sintered body data 1324 is generated from the main body data 1322 and the base data 1323.

Thereafter, after the base plate 8 is mounted, the control unit 131 moves the modeling table 3, and according to the sintered body data 324, repeats the recoating step and the sintering step to form the base part 211a (311a) of the sintered body 211 (311) on the modeling table 3 in the base part formation step. Thereafter, in the main body part formation step, the recoating step and the sintering step are repeated to form the main body part 211b (311b) of the sintered body 211 (311) on the base part 211a (311a), and the sintered body 211 (311) is formed to obtain a desired three-dimensional molded object.

In the three-dimensional molded object formed in this manner, the crack C enters the base part 211a (311a) during the formation of the main body part 211b (311b), and the warpage of the main body part 211b (311b) can be reduced.

In the embodiment, the sintered body data 1324 is generated by the control unit 131, but the sintered body data 1324 including the information of the base part and the information of the main body part created outside may be read without being generated by the control unit 131, to form the sintered bodies 211 and 311.

The lamination molding apparatus of the present disclosure includes: a recoater head that uniformly spreads metal material powder on a modeling table at a predetermined height to form a material powder layer; a laser light irradiation device that irradiates the material powder layer with laser light, and heats and melts the material powder to form a sintered layer; and a control device that forms a sintered body, which is an three-dimensional molded object, by repeatedly driving and controlling the recoater head and the laser light irradiation device; the control device reads sintered body data, that is configured by the shape of a base part in which at least a plurality of support members with constricted central portion are arranged continuously and the shape of a main body part which is a final molded product, and drives and controls the laser light irradiation device and the recoater head to form the sintered body.

In addition, the manufacturing method for three-dimensional molded object of the present disclosure includes: a base part formation step for uniformly spreading metal material powder on a modeling table to form a material powder layer, irradiating an irradiation region of the material powder layer with laser light or electron beam, and heating and melting the material powder and then cooling and solidifying the material powder, to form a base part of a sintered body; and a main body part formation step for further uniformly spreading the metal material powder on the base part to form a material powder layer, irradiating an irradiation region of the material powder layer with laser light, heating and melting, and cooling and solidifying the material powder, to form a main body part of the sintered body; the base part formation step forms the base part by continuously forming a plurality of support members with constricted central portion on the modeling table.

Furthermore, the three-dimensional molded object of the present disclosure is configured by a base part in which a plurality of support members with constricted central portion are arranged continuously and a main body part which is a final molded product arranged integrally on the base part, and is formed of a sintered body made of metal or resin.

Here, the final molded product of the present disclosure is a three-dimensional structure such as a mold or the like which can be shipped and used directly, and refers to a main body part that is obtained by cutting, after a sintered body which is the three-dimensional structure is formed in the present disclosure, a base part of the sintered body with a cutting device and that is separated from the base part.

According to the present disclosure, by arranging the base part configured by the plurality of support members with constricted central portion on the main body part used as a final molded product, a crack such as a chap, a fissure or the like can be generated in at least a part of the base part due to the stress generated in a sintered body when the sintered body which is an three-dimensional molded object is formed. In this way, it is possible to reduce the warpage of the main body part without causing any stress to remain in the formed sintered body.

Then, by mounting the base part in which the support members with constricted central portion are continuously arranged on the main body part which is a final molded product to form the three-dimensional molded object, a final molded product in which the warpage is reduced when the base part is separated from the main body part can be provided.

Furthermore, since the support member is formed in a constricted shape that gradually decreases from the upper surface and the bottom surface to the center of the support member, the cracks are generated easily at the central position of the support member, and it is possible to easily reduce the residual stress.

In the lamination molding apparatus of the present disclosure, the control device reads the sintered body data in which the shape of the base part is changed according to the shape of the main body part, and drives and controls the laser light irradiation device and the recoater head to form the sintered body.

In addition, in the manufacturing method for three-dimensional molded object of the present disclosure, the base part formation step changes the shape of the base part according to the shape of the main body part to form the base part.

The residual stress is generated due to the fixation of the bottom surface of the main body part to the base plate, and thus is determined by the shape of the main body part. For example, when the size (modeling size) of the bottom surface of the main body part is large, the stress remaining in the main body part increases, and the generated warpage also increases.

Thus, by arranging the base part corresponding to the residual stress of the main body part, the cracks can be generated appropriately in the base part during the formation of the sintered body, and the residual stress can be reduced.

In the lamination molding apparatus of the present disclosure, when the modeling size of the main body part is large, the control device reads the sintered body data, that is configured by the shape of the base part in which the shape of the support member located on the outermost periphery of the base part is changed and the shape of the main body part, and drives and controls the laser light irradiation device and the recoater head to form the sintered body.

In addition, in the manufacturing method for three-dimensional molded object of the present disclosure, when the modeling size of the main body part is large, the base part formation step changes the shape of the support member located on the outermost periphery of the base part to form the base part.

Furthermore, in the three-dimensional molded object of the present disclosure, the support member is configured by an inverted truncated pyramid-shaped upper part, a prismatic central part, and a truncated pyramid-shaped lower part; and the area of the lower bottom surface of the lower part is smaller than the area of the upper bottom surface of the upper part.

In addition, in the three-dimensional molded object of the present disclosure, the support member arranged on the outermost periphery of the base part is formed with a larger cross-sectional area of the central part than the cross-sectional area of the central part of the other support members.

According to the present disclosure, since only one row of the support members arranged on the outermost periphery in the base part are formed with a larger cross-sectional area of the central part, and thus the cracks can be generated without collapse even if the modeling size of the main body part becomes large.

In addition, the area of the bottom surface of the support member is formed smaller than the area of the upper surface, and thus the main body part can be stably supported by the upper surface, and it is possible to provide a base part in which the residual stress is accumulated difficultly in the main body part because the fixation range between the bottom surface and the base plate is small.

As described above, the manufacturing method for three-dimensional molded object and the lamination molding apparatus of the present disclosure can reduce the warpage of the three-dimensional molded object, improve the dimensional precision and shape precision of the three-dimensional molded object, and shorten the modeling time in the lamination molding and the processing time in the secondary processing, and reduce the manufacturing cost of the product obtained by the three-dimensional molded object.

The present disclosure described above can be implemented in various other forms without departing from the spirit and essential characteristics of the present disclosure. Accordingly, the example described in the specification is illustrative and should not be construed as restrictive.

What is claimed is:

1. A manufacturing method for three-dimensional molded object on a base part, comprising:
    a base part formation step comprising uniformly spreading material powder of metal on a modeling table to form a material powder layer, irradiating an irradiation region of the material powder layer with laser light or electron beam, and heating and melting the material powder and then cooling and solidifying the material powder, to form the base part of a sintered body; and
    a main body part formation step for further uniformly spreading the material powder on the base part to form a material powder layer, irradiating an irradiation region of the material powder layer with laser light, heating and melting, and cooling and solidifying the material powder, to form a main body part of the sintered body;
    wherein the base part comprises support members, each support member comprises (i) an upper part comprising an inverted truncated pyramid shape, an upper part bottom surface with a cross-section, and an upper part upper surface joined to the main body part, (ii) a central part comprising a prism shape having the same cross section as the upper part bottom surface, a central part bottom surface, and a central part upper surface joined to the upper part bottom surface (iii) a lower part comprising a truncated pyramid shape, a lower part upper surface comprising the same shape as the central part bottom surface and joined to the central part bottom surface, and a lower part bottom surface joined to a base plate.

2. The manufacturing method for three-dimensional molded object according to claim 1, wherein the base part formation step changes the shape of the base part according to the shape of the main body part to form the base part.

3. The manufacturing method for three-dimensional molded object according to claim 1, wherein when a modeling size of a bottom surface of the main body part is larger than 50 mm×50 mm, the base part formation step changes the shape of the support member located on the outermost periphery of the base part to form the base part.

* * * * *